US012707375B2

(12) United States Patent
Jia et al.

(10) Patent No.: US 12,707,375 B2
(45) Date of Patent: Aug. 11, 2026

(54) BLUETOOTH COMMUNICATION METHOD AND SYSTEM

(71) Applicant: HUAWEI TECHNOLOGIES CO., LTD., Shenzhen (CN)

(72) Inventors: Qinyong Jia, Shanghai (CN); Liang Wang, Shanghai (CN); Haw-Wei Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 18/572,772

(22) PCT Filed: Jun. 13, 2022

(86) PCT No.: PCT/CN2022/098386

§ 371 (c)(1),
(2) Date: Dec. 20, 2023

(87) PCT Pub. No.: WO2022/267917

PCT Pub. Date: Dec. 29, 2022

(65) Prior Publication Data

US 2024/0373326 A1 Nov. 7, 2024

(30) Foreign Application Priority Data

Jun. 22, 2021 (CN) ......................... 202110690043.7

(51) Int. Cl.
*H04W 48/10* (2009.01)
*H04L 5/00* (2006.01)
*H04W 76/14* (2018.01)

(52) U.S. Cl.
CPC ........... *H04W 48/10* (2013.01); *H04L 5/0048* (2013.01); *H04W 76/14* (2018.02)

(58) Field of Classification Search
CPC ...... H04W 48/10; H04W 76/14; H04L 5/0048
See application file for complete search history.

(56) References Cited

U.S. PATENT DOCUMENTS 10,142,122 B1 11/2018 Hill et al.
2018/0107468 A1* 4/2018 Huang .................... H04W 8/24
2021/0051039 A1* 2/2021 Qiao ..................... H04W 76/10

FOREIGN PATENT DOCUMENTS

CN 112152853 A 12/2020

* cited by examiner

*Primary Examiner* — Samina F Choudhry

(57) ABSTRACT

Embodiments of this application provide a Bluetooth communication method and system. The method includes: A first electronic device to be added to a BLE network may actively send a request for joining the BLE network, and a second electronic device in the BLE network may prompt, in response to the request of the first electronic device, a third electronic device that currently, there is the first electronic device to be added to the BLE network. The third electronic device may display a pop-up prompt, to notify a user that currently, there is the first electronic device to be added to the BLE network. After the user agrees, the third electronic device prompts the second electronic device to configure the BLE network for the first electronic device.

20 Claims, 16 Drawing Sheets

BLUETOOTH COMMUNICATION METHOD AND SYSTEM

CROSS-REFERENCE TO RELATED APPLICATIONS

This application is a National Stage of International Application No.

PCT/CN2022/098386, filed on Jun. 13, 2022, which claims priority to Chinese Patent Application No. 202110690043.7, filed on Jun. 22, 2021, both of which are hereby incorporated by reference in their entireties.

TECHNICAL FIELD

Embodiments of this application relate to the communication field, and in particular, to a Bluetooth communication method and system.

BACKGROUND

In a current home BLE (Bluetooth Low Energy, Bluetooth low energy) network, to add a new smart home device to the BLE network, a user needs to control a gateway in the BLE network by using a mobile phone, so that the gateway in the BLE network actively scans the new smart home device, to add the smart home device to the BLE network after the smart home device is scanned. This implementation process is complex and not user-friendly, with compromising user experience.

SUMMARY

To resolve the foregoing technical problem, this application provides a Bluetooth communication method and system. In the method, when a new electronic device needs to be added to a BLE network, the new electronic device may actively initiate a request for joining the BLE network, and the electronic device in the BLE network may display a pop-up prompt to notify a user. This simplifies a process of adding the electronic device to the BLE network, provides a simpler operation entry for the user, and improves user experience.

According to a first aspect, an embodiment of this application provides a Bluetooth communication system. The system includes a first electronic device, a second electronic device, and a third electronic device. The second electronic device belongs to Bluetooth low energy BLE network. The first electronic device is configured to send a BLE network configuration broadcast message, where the BLE network configuration broadcast message indicates that the first electronic device needs to be added to the BLE network. The second electronic device is configured to send first network configuration indication information to the third electronic device in response to the received BLE network configuration broadcast message, where the first network configuration indication information indicates that the first electronic device needs to be added to the BLE network. The third electronic device is configured to display a first prompt box in response to the received first network configuration indication information, where the first prompt box includes first indication information, and the first indication information is used to prompt that the first electronic device needs to be added to the BLE network. The third electronic device sends second network configuration indication information to the second electronic device in response to a received first user operation, where the second network configuration indication information indicates to add the first electronic device to the BLE network. The second electronic device is further configured to add the first electronic device to the BLE network in response to the received second network configuration indication information. In this way, in this embodiment of this application, the electronic device to be added to the BLE network may actively initiate a request for joining the BLE network. The electronic device (for example, the first electronic device) in the BLE network may display a pop-up prompt based on the request of the electronic device to be added to the BLE network, to notify a user that currently, there is the electronic device to be added to the BLE network.

For example, the BLE network may further include another electronic device, and may communicate with the first electronic device through BLE connection.

For example, the first electronic device is optionally a sound box.

For example, the third electronic device is optionally a mobile phone, a tablet, a laptop, or the like.

For example, all devices in the BLE network have a same account.

According to the first aspect, the second electronic device is further configured to obtain a communication quality parameter between the second electronic device and the first electronic device in response to the received BLE network configuration broadcast message. In this way, the second electronic device may determine, based on the communication quality parameter, whether a distance between the first electronic device and the second electronic device meets a requirement. For example, when the second electronic device is far away from the first electronic device, a corresponding communication quality parameter is poor, so that a smart home device at a home of another user can be prevented from joining a BLE network at a home of a current user by mistake.

According to any one of the first aspect or the foregoing implementations of the first aspect, the second electronic device is further configured to: when the communication quality parameter is greater than a first threshold, send the first network configuration indication information to the third electronic device. In this way, when the communication quality parameter of the first electronic device is greater than a specified threshold, the second electronic device may perform a subsequent network configuration operation, to avoid adding a smart home device in the home of the another user to the BLE network of the current user.

According to any one of the first aspect or the foregoing implementations of the first aspect, the second electronic device performs data exchange with a cloud through a first communication connection. The third electronic device performs data exchange with the cloud through a second communication connection. The second electronic device is further configured to send the first network configuration indication information to the cloud through the first communication connection, so that the cloud sends the first network configuration indication information to the third electronic device through the second communication connection. In this way, when the second electronic device and the third electronic device are connected to the network, the second electronic device and the third electronic device may perform data exchange on the cloud, to exchange the network configuration indication information.

According to any one of the first aspect or the foregoing implementations of the first aspect, the first communication connection is a wireless fidelity Wi-Fi connection, and the second communication connection is a cellular connection or a Wi-Fi connection. For example, the first communication connection may also be wired connection, or wireless connection of another type. This is not limited in this application. For example, the second communication connection may be wireless connection of another type. This is not limited in this application.

According to any one of the first aspect or the foregoing implementations of the first aspect, the second electronic device performs data exchange with the third electronic device through a third communication connection, and the second electronic device is further configured to send the first network configuration indication information to the third electronic device through the third communication connection. In this way, the second electronic device and the third electronic device may exchange the network configuration indication information in a direct connection manner.

According to any one of the first aspect or the foregoing implementations of the first aspect, the third communication connection is a Wi-Fi connection or a Bluetooth connection. For example, the third communication connection may be wireless connection of another type. This is not limited in this application.

According to any one of the first aspect or the foregoing implementations of the first aspect, the third electronic device is specifically configured to display the first prompt box in a first display interface in response to the received first network configuration indication information. In this way, the third electronic device in this embodiment of this application may display the first prompt box on a specified display interface.

According to any one of the first aspect or the foregoing implementations of the first aspect, the first display interface is an always on display screen, a lock screen, or a home screen. In this way, in response to the request of the second electronic device, the third electronic device in this embodiment of this application may display a pop-up prompt on the always on display screen, the lock screen, or the home screen, to notify the user that currently, there is an electronic device to be added to the BLE network.

According to any one of the first aspect or the foregoing implementations of the first aspect, the third electronic device is specifically configured to display the first prompt box on a leftmost screen and/or a notification bar in response to the received first network configuration indication information. In this way, the third electronic device in this embodiment of this application may display a prompt box on the leftmost screen and/or the notification bar, so that when the user agrees that the to-be-joined electronic device joins the BLE network, the leftmost screen and/or the notification bar may be invoked at any time, and the first electronic device is allowed, by using the prompt box, to join the BLE network.

According to any one of the first aspect or the foregoing implementations of the first aspect, the second electronic device is further configured to send third network configuration indication information to the third electronic device, where the third network configuration indication information indicates that the first electronic device is added to the BLE network. In this way, the third electronic device may control the first electronic device after determining that the first electronic device is added to the BLE network. For example, the third electronic device may control the first electronic device by using the second electronic device.

According to any one of the first aspect or the foregoing implementations of the first aspect, the third electronic device is further configured to display an AI Life application interface in response to the received third network configuration indication information, where the AI Life application interface includes a second prompt box, the second prompt box includes second indication information, and the second indication indicates that the first electronic device is added to the BLE network. In this way, the user may determine, by using the AI Life application interface, that the first electronic device is added to the BLE network. For example, the user may control the first electronic device by using an AI Life application. For example, the second prompt box may be a control 613 in FIG. 6*f* in this embodiment of this application. For example, the second indication information may be prompt information included in the control 613, for example, including but not limited to a device name of a desk lamp, information indicates that the desk lamp is a newly added device (for example, (new) in the figure), a position of the desk lamp, and an online status of the desk lamp.

According to the first aspect or any one of the foregoing implementations of the first aspect, the second electronic device is further configured to send a Bluetooth broadcast message in response to a received first user instruction, where the Bluetooth broadcast message includes address information of the first electronic device and a first control instruction. The first electronic device is further configured to perform a corresponding action based on the first control instruction in response to the received Bluetooth broadcast message.

According to a second aspect, an embodiment of this application provides a Bluetooth communication method. The method includes: A first electronic device receives first network configuration indication information from a second electronic device, where the first network configuration indication information is sent by the second electronic device in response to a received BLE network configuration broadcast message from a third electronic device, the BLE network configuration broadcast message indicates that the third electronic device needs to be added to a BLE network, the first network configuration indication information indicates that the third electronic device needs to be added to the BLE network, and the second electronic device belongs to the BLE network; the first electronic device displays a first prompt box in response to the received first network configuration indication information, where the first prompt box includes first indication information, and the first indication information is used to prompt that the third electronic device needs to be added to the BLE network; and the first electronic device sends second network configuration indication information to the second electronic device in response to a received first user operation, where the second network configuration indication information indicates to add the third electronic device to the BLE network, so that the second electronic device adds the third electronic device to the BLE network in response to the received second network configuration indication information.

According to the second aspect, the first network configuration indication information is sent by the second electronic device to a cloud through a first communication connection between the second electronic device and the cloud, and is sent by the cloud to the first electronic device through a second communication connection between the cloud and the first electronic device.

According to any one of the second aspect or the foregoing implementations of the second aspect, the first communication connection is a wireless fidelity Wi-Fi connection, and the second communication connection is a cellular connection or a Wi-Fi connection.

According to any one of the second aspect or the foregoing implementations of the second aspect, the first electronic device performs data exchange with the second electronic device through a third communication connection. That a first electronic device receives first network configuration indication information from a second electronic device includes: The first electronic device receives the first network configuration indication information that is sent by the second electronic device through the third communication connection.

According to any one of the second aspect or the foregoing implementations of the second aspect, the third communication connection is a Wi-Fi connection or a Bluetooth connection.

According to any one of the second aspect or the foregoing implementations of the second aspect, that the first electronic device displays a first prompt box in response to the received first network configuration indication information includes: The first electronic device displays the first prompt box in a first display interface in response to the received first network configuration indication information.

According to any one of the second aspect or the foregoing implementations of the second aspect, the first display interface is an always on display screen, a lock screen, or a home screen.

According to any one of the second aspect or the foregoing implementations of the second aspect, that the first electronic device displays a first prompt box in response to the received first network configuration indication information includes: The first electronic device displays the first prompt box on a leftmost screen and/or a notification bar in response to the received first network configuration indication information.

According to any one of the second aspect or the foregoing implementations of the second aspect, the method further includes: The first electronic device receives third network configuration indication information sent by the second electronic device, where the third network configuration indication information indicates that the third electronic device is added to the BLE network.

According to any one of the second aspect or the foregoing implementations of the second aspect, the method further includes: The first electronic device displays an AI Life application interface in response to the received third network configuration indication information, where the AI Life application interface includes a second prompt box, the second prompt box includes second indication information, and the second indication indicates that the third electronic device is added to the BLE network.

The second aspect and any implementation of the second aspect respectively correspond to the first aspect and any implementation of the first aspect. For technical effects corresponding to the second aspect and any implementation of the second aspect, refer to the technical effects corresponding to the first aspect and any implementation of the first aspect. Details are not described herein again.

According to a third aspect, an embodiment of this application provides an electronic device. The electronic device includes a memory and a processor. The memory is coupled to the processor. The memory stores program instructions. When the program instructions are executed by the processor, the electronic device is enabled to perform the Bluetooth communication method in any one of the second aspect or the possible implementations of the second aspect.

According to a fourth aspect, an embodiment of this application provides a chip, including one or more interface circuits and one or more processors. The interface circuit is configured to receive a signal from a memory of an electronic device, and send the signal to the processor, where the signal includes computer instructions stored in the memory. When the processor executes the computer instructions, the electronic device performs the Bluetooth communication method in any one of the second aspect or the possible implementations of the second aspect.

According to a fifth aspect, an embodiment of this application provides a computer storage medium, where the computer readable storage medium stores a computer program. When the computer program is run on a computer or a processor, the computer or the processor performs the Bluetooth communication method according to any one of the second aspect or the possible implementations of the second aspect.

DESCRIPTION OF EMBODIMENTS

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first target object, and a second target object are used to distinguish between different target objects, but are not used to describe a particular order of the target objects.

In addition, in embodiments of this application, the expression "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word like "example" or "for example" is intended to present a related concept in a specific manner.

In the description of embodiments of this application, unless otherwise stated, "a plurality of" means two or more than two. For example, a plurality of processing units means two or more processing units; and a plurality of systems mean two or more systems.

Figure 1:
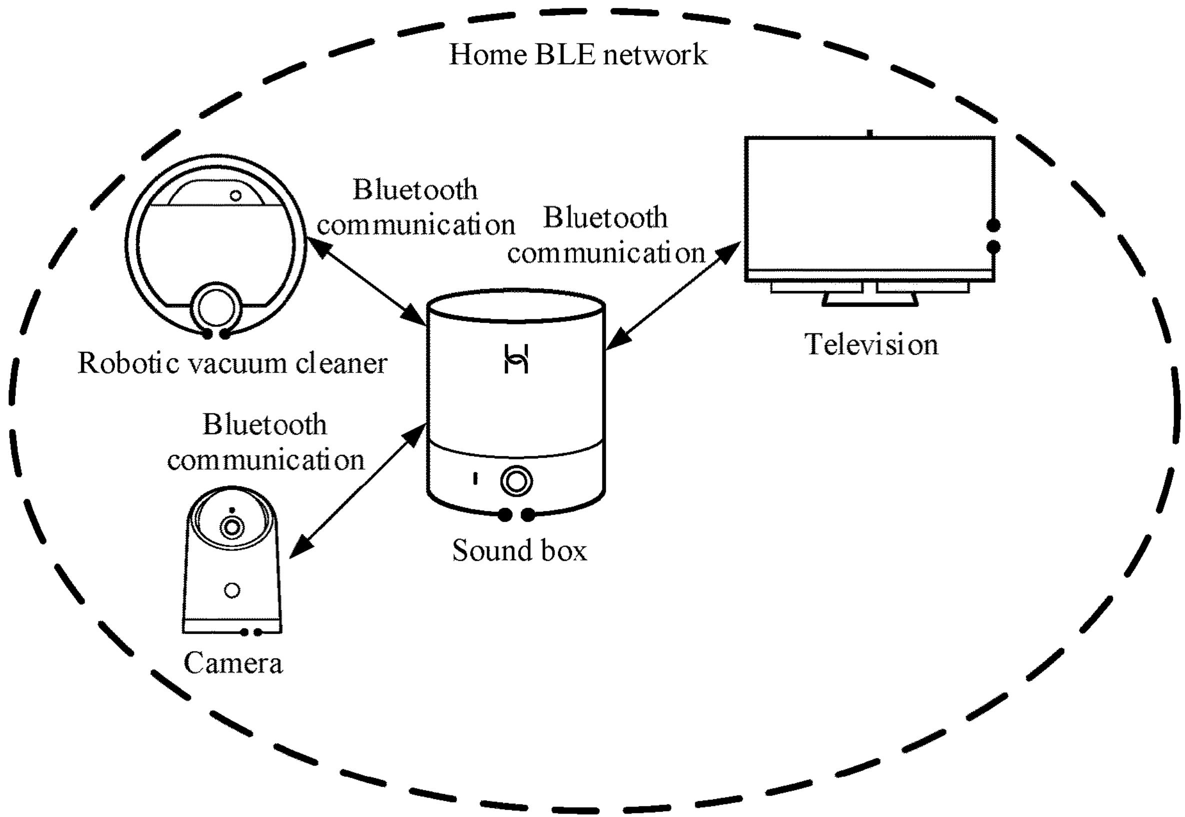
FIG. 1 is a schematic diagram of an example of an application scenario.

Before the technical solutions in embodiments of this application are described, an application scenario in embodiments of this application is first described with reference to the accompanying drawings. FIG. 1 is a schematic diagram of an application scenario according to an embodiment of this application. The application scenario may be understood as a home scenario of a user. To be specific, the home of the user includes but is not limited to electronic devices with a Bluetooth function, such as a sound box, a television, a camera, and a robotic vacuum cleaner. Optionally, the electronic devices (for example, the sound box, the television, the camera, and the robotic vacuum cleaner shown in FIG. 1) in this embodiment of this application may have a same account.

For example, in this embodiment of this application, the sound box may separately perform Bluetooth communication with the television, the robotic vacuum cleaner, and the camera, to control devices such as the television, the robotic vacuum cleaner, and the camera. For example, a Bluetooth network including the sound box, the camera, the television, and the robotic vacuum cleaner may be referred to as a home BLE network or a home BLE network.

It should be noted that a device type and a quantity of devices shown in FIG. 1 are merely examples. This is not limited in this application.

It should be further noted that, in this embodiment of this application, only an example in which the sound box is used as a gateway in the home BLE network is used for description. In another embodiment, the application scenario may include a plurality of gateways, and each gateway is communicatively connected to at least one electronic device of the gateway to form a BLE network. In addition, electronic devices in a plurality of BLE networks may overlap, that is, one electronic device may belong to a plurality of BLE networks. This is not limited in this application. The "gateway" in this embodiment of this application is optionally a device that controls another electronic device through a Bluetooth connection to the another electronic device. It may also be further understood as a device that may control another electronic device in response to a user instruction.

It should be further noted that in this embodiment of this application, only a star BLE network including the sound box and another electronic device (including the television, the robotic vacuum cleaner, the camera, and the like) is used as an example for description. In other embodiments, the BLE network may also be a mesh (Mesh) structure. This is not limited in this application.

It should be further noted that in this embodiment of this application, only the BLE network is used as an example for description. In another embodiment, the connection between the electronic devices in the scenario may alternatively be maintained according to another wireless protocol (for example, a wireless fidelity (Wi-Fi) protocol). This is not limited in this application. Optionally, the network configuration method in this embodiment of this application may be applied to another networking scenario, for example, may be applied to a Wi-Fi network. Details are not described in this application.

Figure 2:
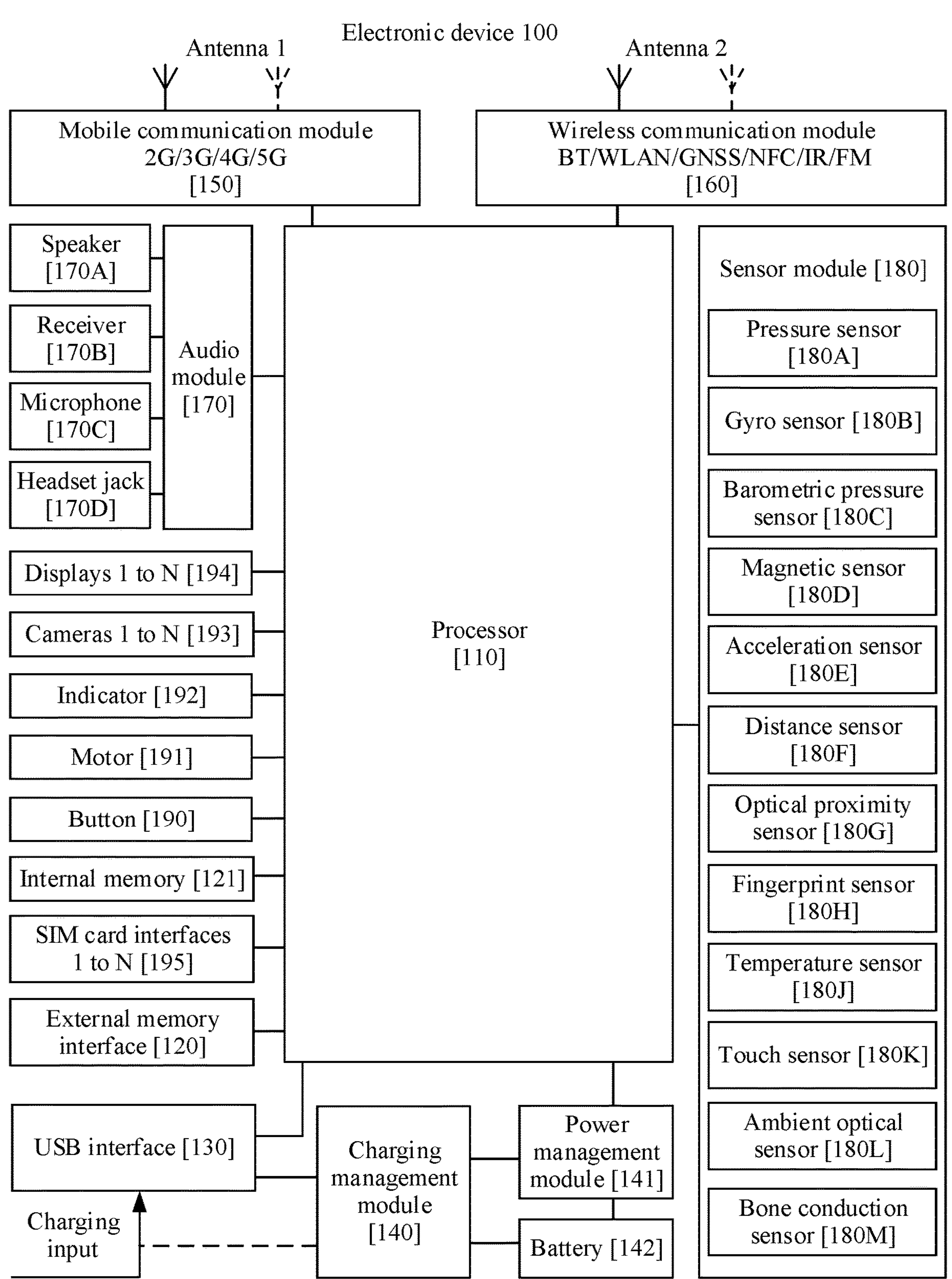
FIG. 2 is a schematic diagram of an example of a hardware structure of an electronic device.

FIG. 2 is a schematic diagram of a structure of an electronic device 100. It should be understood that the electronic device 100 shown in FIG. 2 is merely an example of the electronic device, and the electronic device 100 may have more or fewer components than those shown in the figure, or may combine two or more components, or may have different component configurations. Various components shown in FIG. 1 may be implemented in hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through the Bluetooth headset.

The MIPI interface may be configured to connect the processor 110 to a peripheral component like the display 194 or the camera 193. The MIPI interface includes a camera serial interface (camera serial interface, CSI), a display serial interface (display serial interface, DSI), and the like. In some embodiments, the processor 110 communicates with the camera 193 via the CSI interface, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device like an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution, applied to the electronic device 100, to wireless communication including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some function modules in the mobile communication module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another function module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, the antenna 1 of the electronic device 100 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor. For example the audio function includes music playback, recording, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130 or a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a moving posture of the electronic device 100. In some embodiments, an angular velocity of the electronic device 100 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, features such as automatic unlocking of the flip cover are set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in applications such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and a touchscreen, also referred to as a "touchscreen", is formed by the touch sensor 180K and the display 194. The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a micro service architecture, or a cloud architecture. In embodiments of this application, an Android system with a layered architecture is used as an example to describe a software structure of the electronic device 100.

Figure 3:
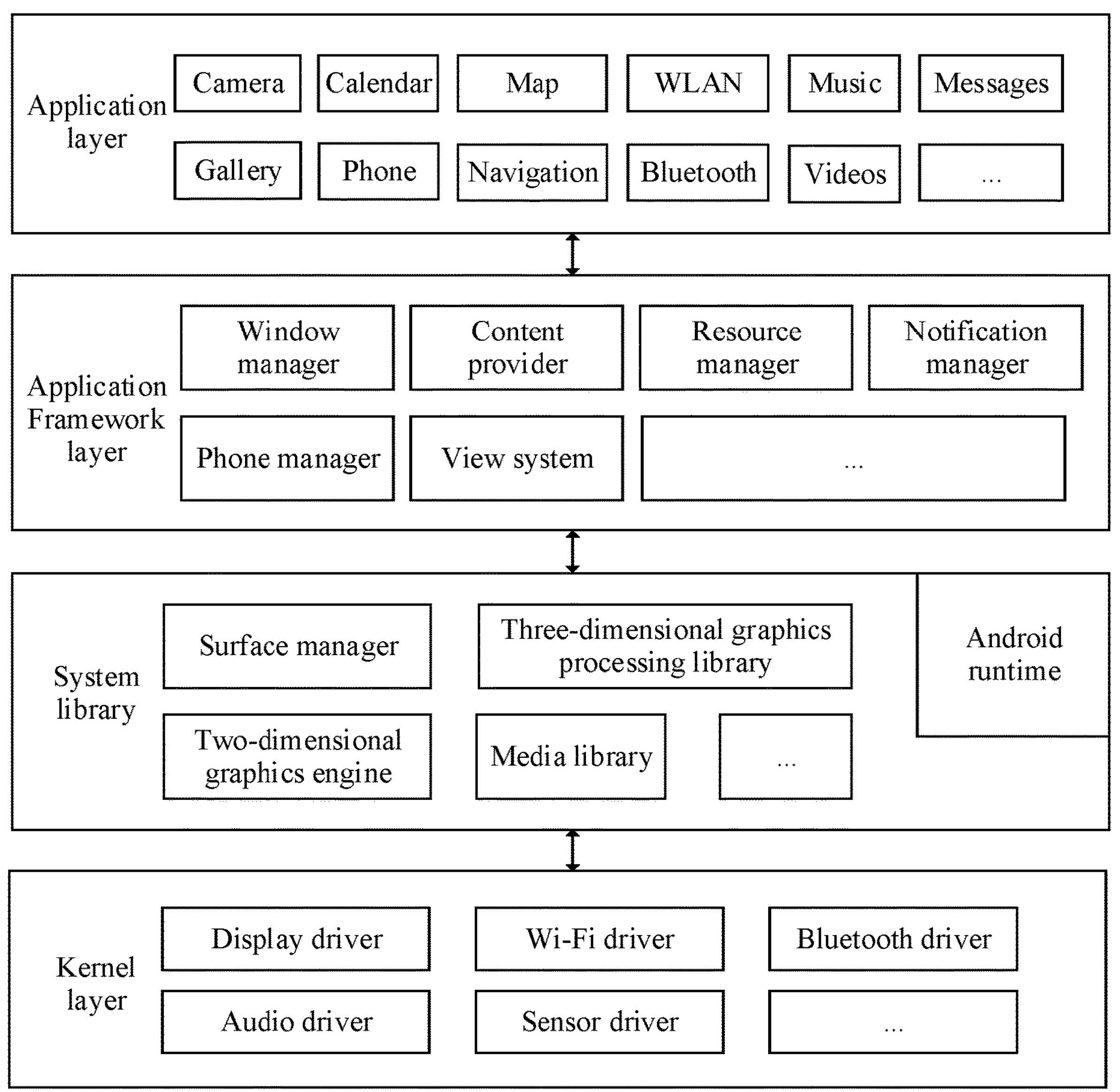
FIG. 3 is a schematic diagram of an example of a software structure of an electronic device.

FIG. 3 is a block diagram of the software structure of the electronic device 100 according to an embodiment of this application.

In a layered architecture of the electronic device 100, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application program. The data may include a video, an image, an audio, calls that are made and answered, a browsing history and bookmarks, an address book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It may be understood that components included in the system framework layer and the system library and runtime layer shown in FIG. 3 do not constitute a specific limitation on the electronic device 100. In some other embodiments of this application, the electronic device 100 may include more or fewer components than those shown in the figure, or some components may be combined, or some components may be split, or different component arrangements may be used.

Figure 4:
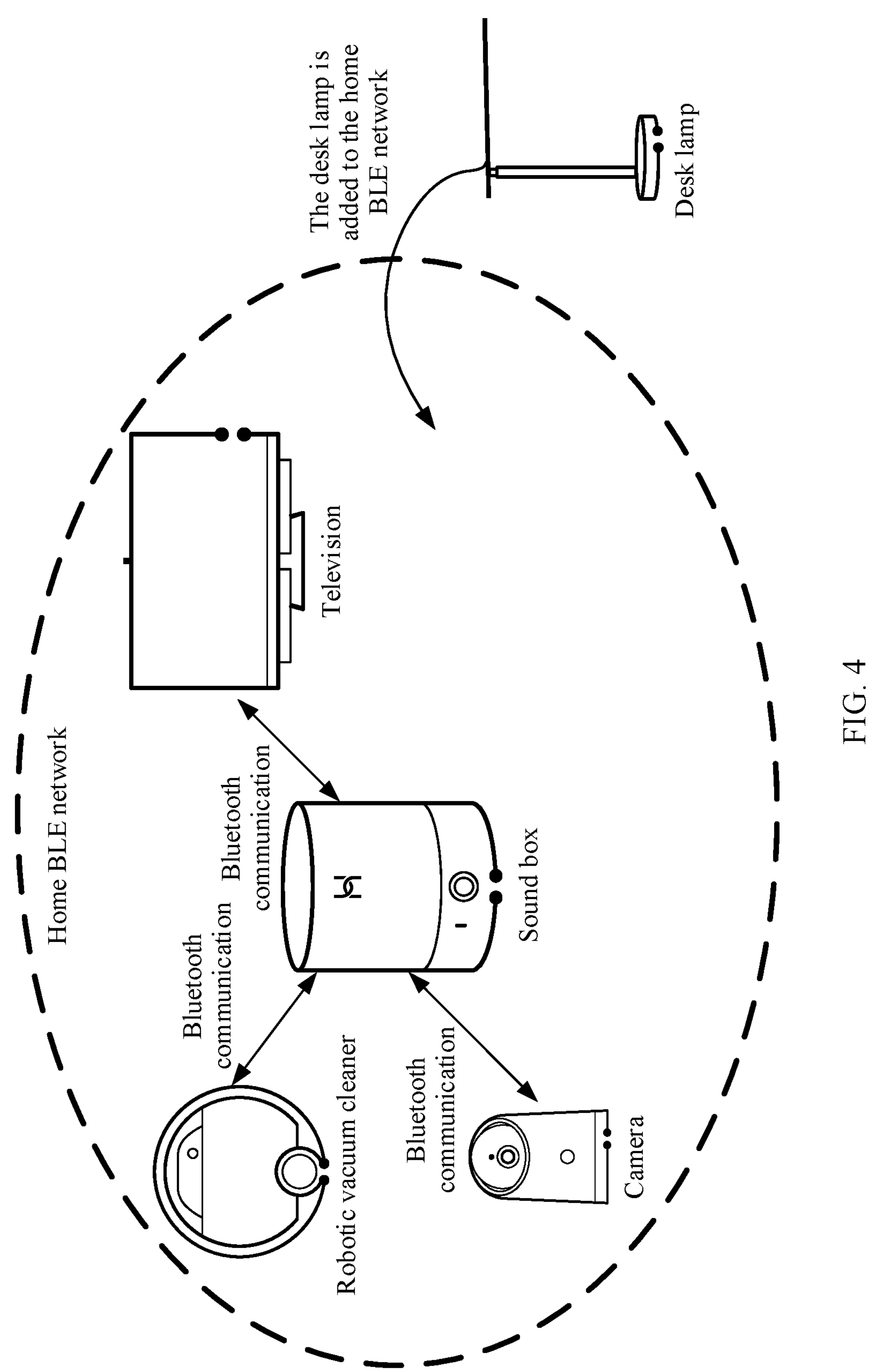
FIG. 4 is a schematic diagram of an example of a scenario in which an electronic device is added to a home BLE network.

With reference to the application scenario shown in FIG. 1, FIG. 4 is a schematic diagram of an example of a scenario in which an electronic device is added to a home BLE network. Refer to FIG. 4. For example, a user purchases a desk lamp at a home, and expects to add the desk lamp to a home BLE network, so that the user can control the desk lamp by using a sound box.

Figure 5:
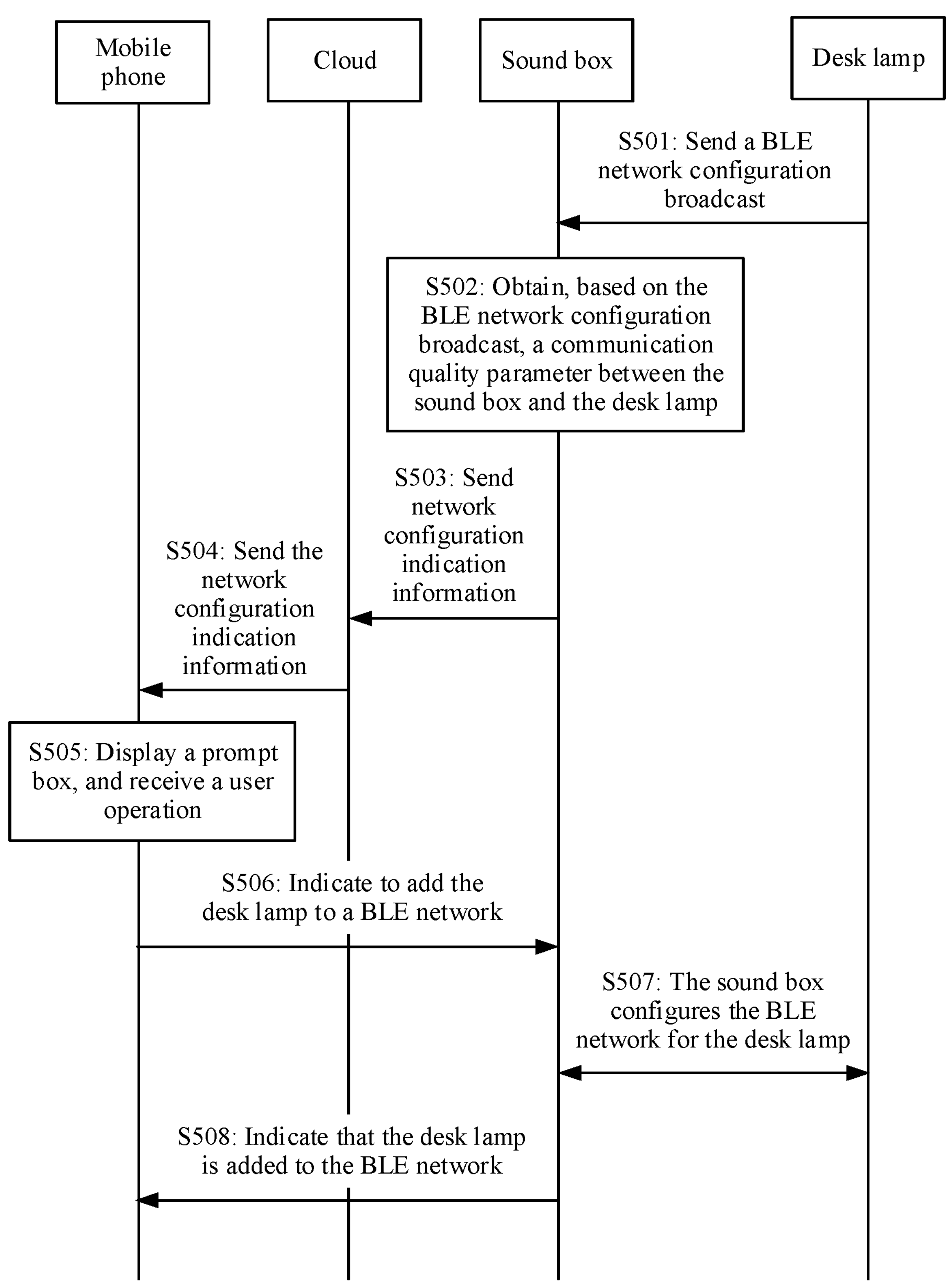
FIG. 5 is a schematic flowchart of an example in which an electronic device is added to a BLE network.

Refer to FIG. 4. The following describes, by using a specific embodiment, a manner in which an electronic device is added to a BLE network according to an embodiment of this application. FIG. 5 is a schematic flowchart of an example in which an electronic device is added to a BLE network. Refer to FIG. 5. The method specifically includes the following steps.

S501: A desk lamp sends a BLE network configuration broadcast.

For example, after the desk lamp is powered on for the first time or is restored to factory settings, the desk lamp may send a BLE network configuration broadcast message in real time or periodically, to perform BLE network configuration with a gateway (that is, a sound box shown in FIG. 4) in a BLE network.

For example, there are a plurality of types of Bluetooth messages, and one of the Bluetooth messages is the BLE network configuration broadcast message. For example, a control field (or may be referred to as a header) in the Bluetooth message sent by the desk lamp may carry type information of the Bluetooth message, to indicate that the Bluetooth message is the BLE network configuration broadcast message. Correspondingly, a receive end (for example, the sound box) may determine, by identifying the control field of the Bluetooth message, that the received Bluetooth message is the BLE network configuration broadcast message. It should be noted that for a format of the BLE network configuration broadcast message, refer to descriptions in a BLE standard. Details are not described in this application again.

Optionally, the BLE network configuration broadcast message sent by the desk lamp further includes but is not limited to transmit power information, device information of the desk lamp, and the like. For example, the transmit power information may indicate power used by the desk lamp to send the BLE network configuration broadcast message. It should be noted that, for different types of electronic devices or electronic devices of different vendors, transmit power may be the same or may be different. This is not limited in this application. Optionally, the transmit power information may be included in a data field of the BLE network configuration broadcast message, that is, a payload (payload) field. For example, the device information of the desk lamp may include but is not limited to identification information of the desk lamp, address information of the desk lamp, a universally unique identifier (universally unique identifier) of the desk lamp, and the like. This is not limited in this application.

S502: The sound box obtains, based on the BLE network configuration broadcast, a communication quality parameter between the sound box and the desk lamp.

For example, in this embodiment of this application, the sound box may perform Bluetooth scanning in real time or periodically, to listen to a Bluetooth broadcast message sent by another device. The sound box can receive the BLE network configuration broadcast message sent by the desk lamp. In addition, the sound box may determine, by identifying the control field of the BLE network configuration broadcast message, that the Bluetooth message is the BLE network configuration broadcast message.

For example, in response to the received BLE network configuration broadcast message, the sound box parses the BLE network configuration broadcast message to obtain information such as transmit power carried in the BLE network configuration broadcast message. The sound box may determine a distance between the sound box and the desk lamp based on the obtained transmit power. In an example, if the distance between the sound box and the desk lamp is less than or equal to a threshold, S503 is performed. In another example, if the distance between the sound box and the desk lamp is greater than the threshold, no processing is performed.

It should be noted that the sound box determines the distance between the sound box and the desk lamp. This is merely an example, and a main purpose of the determining is to detect a communication quality between the sound box and the desk lamp. For example, if there is a bearing wall between the sound box and the desk lamp, because attenuation of a Bluetooth signal traversing the bearing wall is large, a value of the distance between the sound box and the desk lamp obtained by the sound box based on the transmit power and the receive power is greater than an actual distance between the sound box and the desk lamp.

It should be further noted that in this embodiment of this application, only an example in which the communication quality parameter is the signal power is used for description. In another example, the sound box may use another communication quality parameter as a detection condition, to detect whether a subsequent network configuration operation can be performed with the desk lamp. For example, the communication quality parameter may alternatively be signal strength or the like. To be specific, the sound box may obtain the corresponding communication quality parameter based on the received BLE network configuration broadcast message. In addition, the sound box may determine, based on thresholds corresponding to different communication quality parameters, whether to perform network configuration with the desk lamp.

S503: The sound box sends network configuration indication information to a cloud.

For example, after determining that the communication quality parameter between the sound box and the sound box meets a set condition, the sound box determines to perform network configuration with the desk lamp. The sound box sends network configuration indication information to the cloud. Optionally, the network configuration indication information includes device information of the desk lamp (for a concept, refer to the foregoing description), and is used to indicate that the desk lamp needs to be added to the home network. For example, after receiving the network configuration indication information, the cloud may perform authentication (which may also be referred to as validity authentication) on the desk lamp based on the device information of the desk lamp. After the authentication succeeds, the cloud sends the network configuration indication information to a mobile phone, that is, performs S504.

For example, the communication connection between the sound box and the cloud may be wireless connection, for example, complying with the 802.11 protocol, or may be a cellular connection, for example, a 5G connection, or may be a combination of any connection types. For example, the connection between the sound box and the router is a Wi-Fi connection, and the connection between the router and the cloud is the 5G connection. The sound box sends the network configuration indication information to a router through the Wi-Fi connection between the sound box and the router, and the router sends the network configuration indication information to the cloud through the 5G connection between the router and the cloud. A specific connection manner may be set based on an actual requirement. This is not limited in this application.

S504: The cloud sends the network configuration indication information to the mobile phone.

For example, the cloud may perform authentication on the desk lamp based on the received network configuration indication information. It should be noted that the desk lamp has been authenticated on the cloud before delivery, that is, the cloud has stored device information corresponding to the desk lamp. Optionally, if the cloud does not detect the device information of the desk lamp, the cloud may determine that authentication of the desk lamp fails, and does not perform processing.

For example, in this embodiment of this application, the cloud detects the device information of the desk lamp, and determines that authentication on the desk lamp succeeds. The cloud may send the network configuration indication information to the mobile phone. Optionally, the network configuration indication information sent by the cloud to the mobile phone may include but is not limited to the identification information of the desk lamp, and is used to indicate that the desk lamp needs to be added to the home network (that is, the home BLE network).

S505: The mobile phone displays a prompt box, and receives a user operation.

For example, the mobile phone receives the network configuration indication information sent by the cloud. Optionally, communication between the mobile phone and the cloud may be maintained based on a cellular network, or may be maintained based on a wireless network like Wi-Fi. This is not limited in this application.

For example, in response to the received network configuration indication information, the mobile phone displays a prompt box, to prompt the user that currently, there is an electronic device to be added to the home network.

Figure 6A:
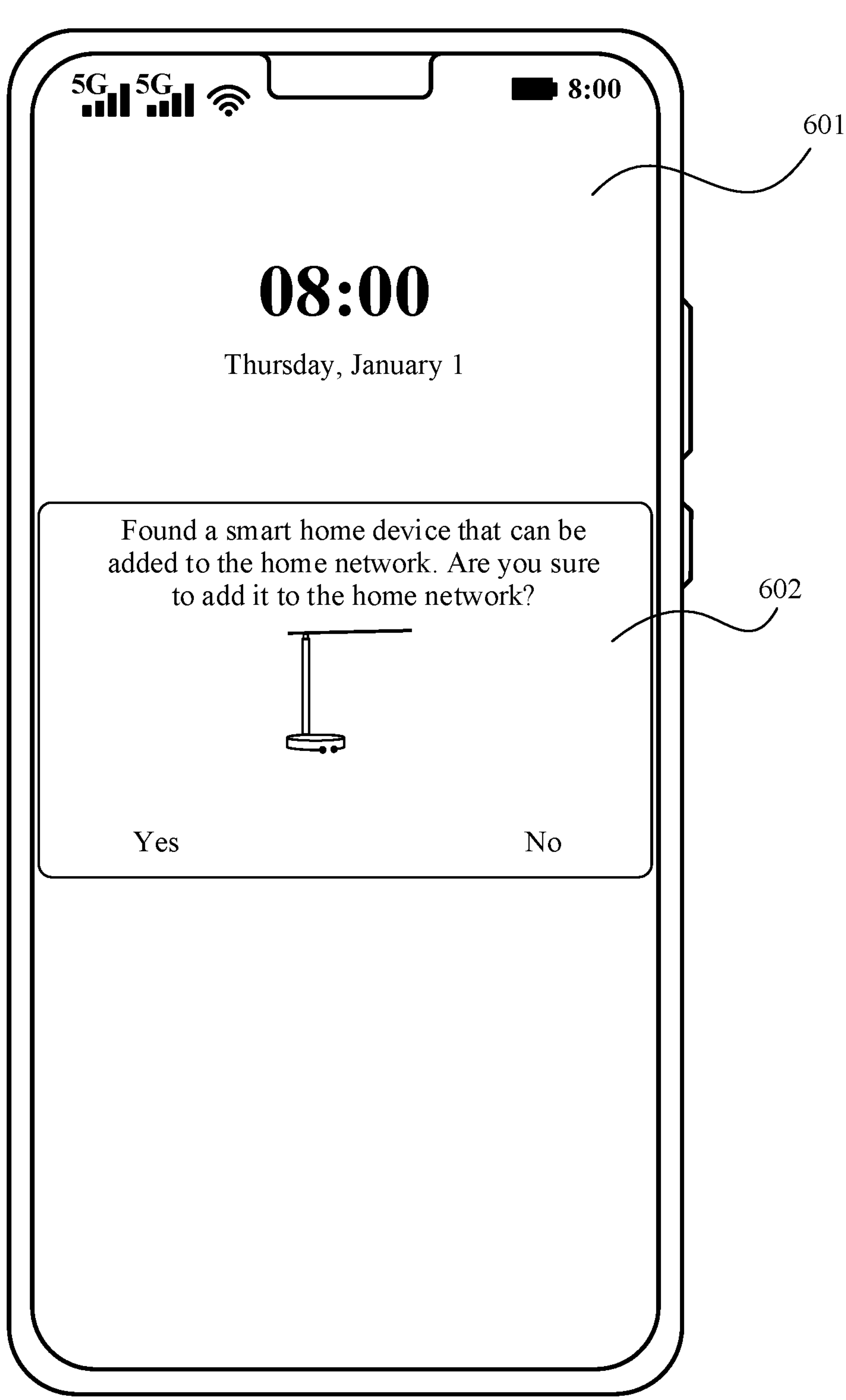
FIG. 6*a* to FIG. 6*f* are schematic diagrams of examples of user interfaces.
Figure 6B:
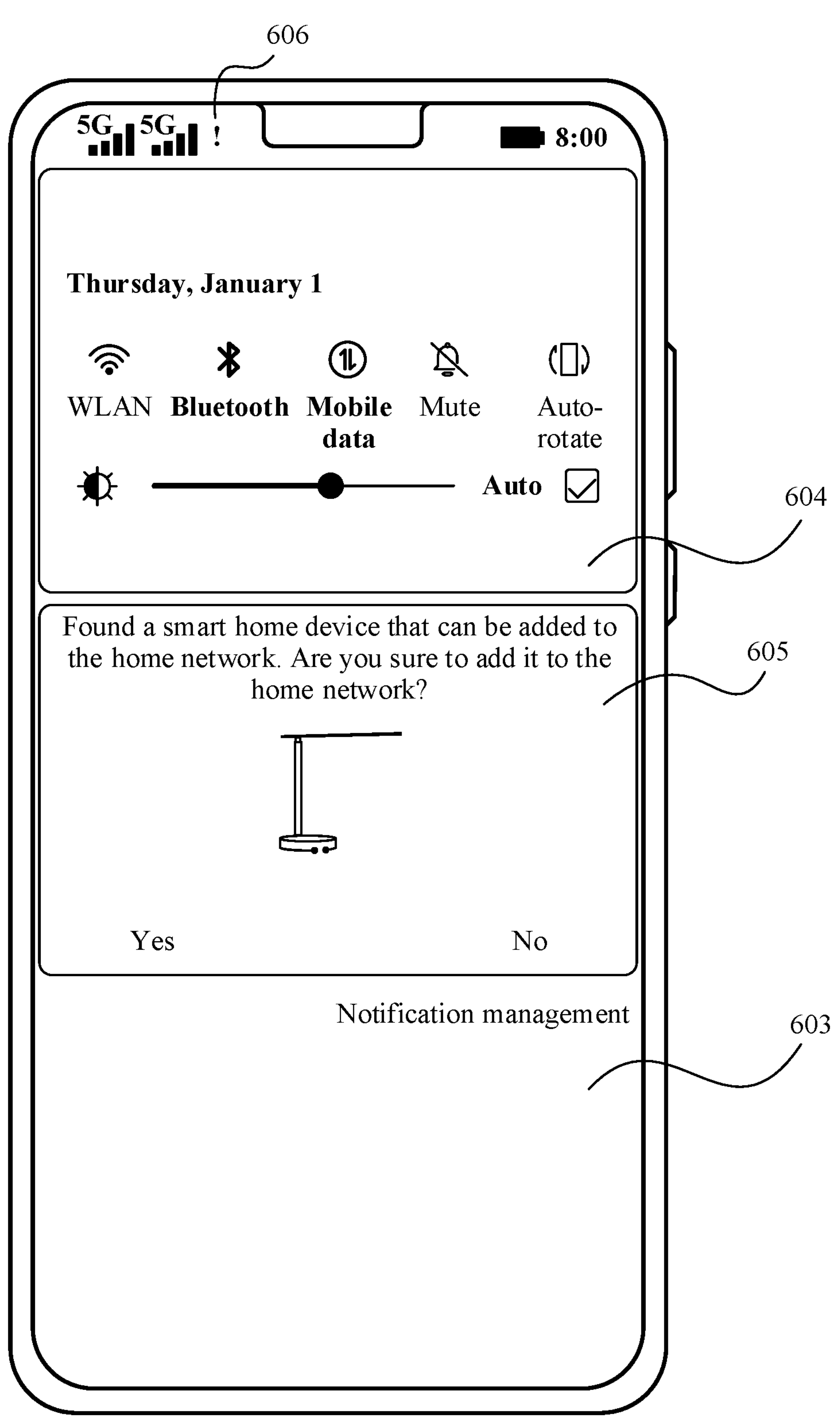
Figure 6C:
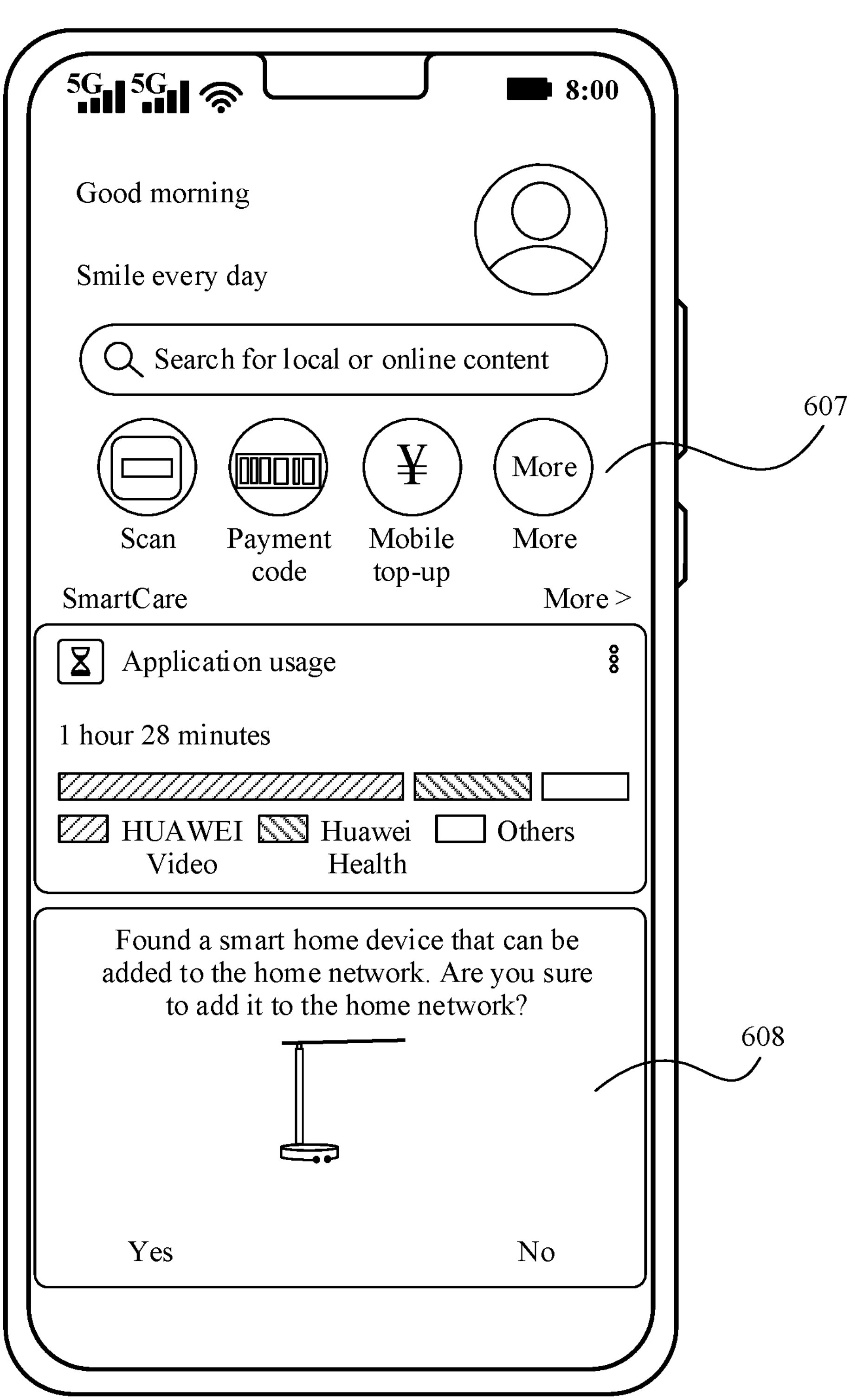

FIG. 6*a* to FIG. 6*c* are schematic diagrams of examples of user interfaces. Refer to FIG. 6*a*. For example, a lock screen 601 of the mobile phone includes one or more controls and a prompt box 602. The control includes but is not limited to a time control, a network control, a power control, and the like. The prompt box 602 may be displayed at any position in the lock screen 601. A position and a size in FIG. 6*a* are merely an example, and are not limited in this application. For example, the prompt box 602 includes but is not limited to prompt information, a device icon, and a "Yes" option and a "No" option. Optionally, the prompt information is used to prompt that currently, there is an electronic device to be added to the home network. For example, the prompt information may be specifically "Found a smart home device that can be added to the home network. Are you sure to add it to the home network?". Optionally, the device icon in the prompt box 602 is obtained by the mobile phone based on the received identification information of the desk lamp. For example, in response to the received identification information of the desk lamp, the mobile phone may find, from the cloud or locally, an icon corresponding to the desk lamp, and display the icon in the prompt box 602. Optionally, the mobile phone may not display the icon of the desk lamp in the prompt box 602, or the mobile phone may display a name or a type of the desk lamp in the prompt box 602. This is not limited in this application. It should be noted that content in the prompt box 602 shown in FIG. 6*a* is merely an example, and is not limited in this application. This is the same as that in the following, and details are not described again.

Refer to FIG. 6*b*. For example, the user may slide downward from an upper edge of the screen. The mobile phone displays a notification bar 604 in a display interface 603 in response to the received user operation. For example, the notification bar 604 includes but is not limited to one or more controls and a prompt box 605. The control includes but is not limited to a Bluetooth control, a mobile data control, an auto-rotation control, a mute control, and the like. For a description of the prompt box 605, refer to the related description of the prompt box 602 in FIG. 6*a*. Details are not described herein again. Optionally, the display interface 603 may display a home screen, an always on display screen, or a lock screen of the mobile phone, or may display any application interface. This is not limited in this application. Optionally, as shown in FIG. 6*b*, after receiving the network configuration indication information sent by the cloud, the mobile phone may display a prompt control 606 above the display interface 603, to prompt that there is a new notification in the notification bar 604.

Refer to FIG. 6*c*. For example, the mobile phone may further display a prompt box 608 on a leftmost screen interface 607. For a description of the prompt box 608, refer to related content of the prompt box 602 in FIG. 6*a*. Details are not described herein again.

In a possible implementation, before the user taps the "Yes" option or the "No" option, the user may select, from a prompt box at any time by invoking a pull-down notification bar or a leftmost screen, whether to allow the desk lamp to join the home network.

For example, the display manner in FIG. 6*b* is used as an example. Optionally, if the user taps the "No" option, the desk lamp is not allowed to join the home network. In response to the received user operation, the mobile phone cancels display of the prompt box, and does not perform subsequent network configuration steps.

For example, in this embodiment of this application, the user may tap the "Yes" option in the prompt box 605, to indicate that the desk lamp is allowed to join the home network. The mobile phone performs S506 in response to the received user operation.

S506: The mobile phone indicates the sound box to add the desk lamp to the BLE network.

For example, in response to a received operation of tapping the "Yes" option by the user, the mobile phone sends indication information to the sound box, to indicate to add the desk lamp to the BLE network.

In an example, the mobile phone may perform data exchange with the sound box on the cloud. For example, the user operates the mobile phone in an office, and the mobile phone may send the indication information to the cloud through a cellular network. The indication information may include but is not limited to the identification information of the desk lamp, to indicate to add the desk lamp to the home BLE network. Correspondingly, the cloud may forward the received indication information to the sound box through a wireless network (for example, a Wi-Fi network).

In another example, the mobile phone may perform data exchange with the sound box through Bluetooth or a wireless network (including a Wi-Fi network, a wireless local area network, or the like). For example, the user operates the mobile phone at home. The mobile phone may establish a Bluetooth connection to the sound box in response to the received user operation, and send the indication information to the sound box through the Bluetooth connection. Alternatively, the mobile phone may establish a Wi-Fi connection to the sound box in response to the received user operation, and send the indication information to the sound box through the Wi-Fi connection. Alternatively, the mobile phone may further send the indication information to the router through the wireless local area network, and the router forwards the indication information to the sound box. A specific transmission manner depends on a communication manner that can be supported between the mobile phone and the sound box. This is not limited in this application.

S507: The sound box configures the BLE network for the desk lamp.

Figures 7, 8:
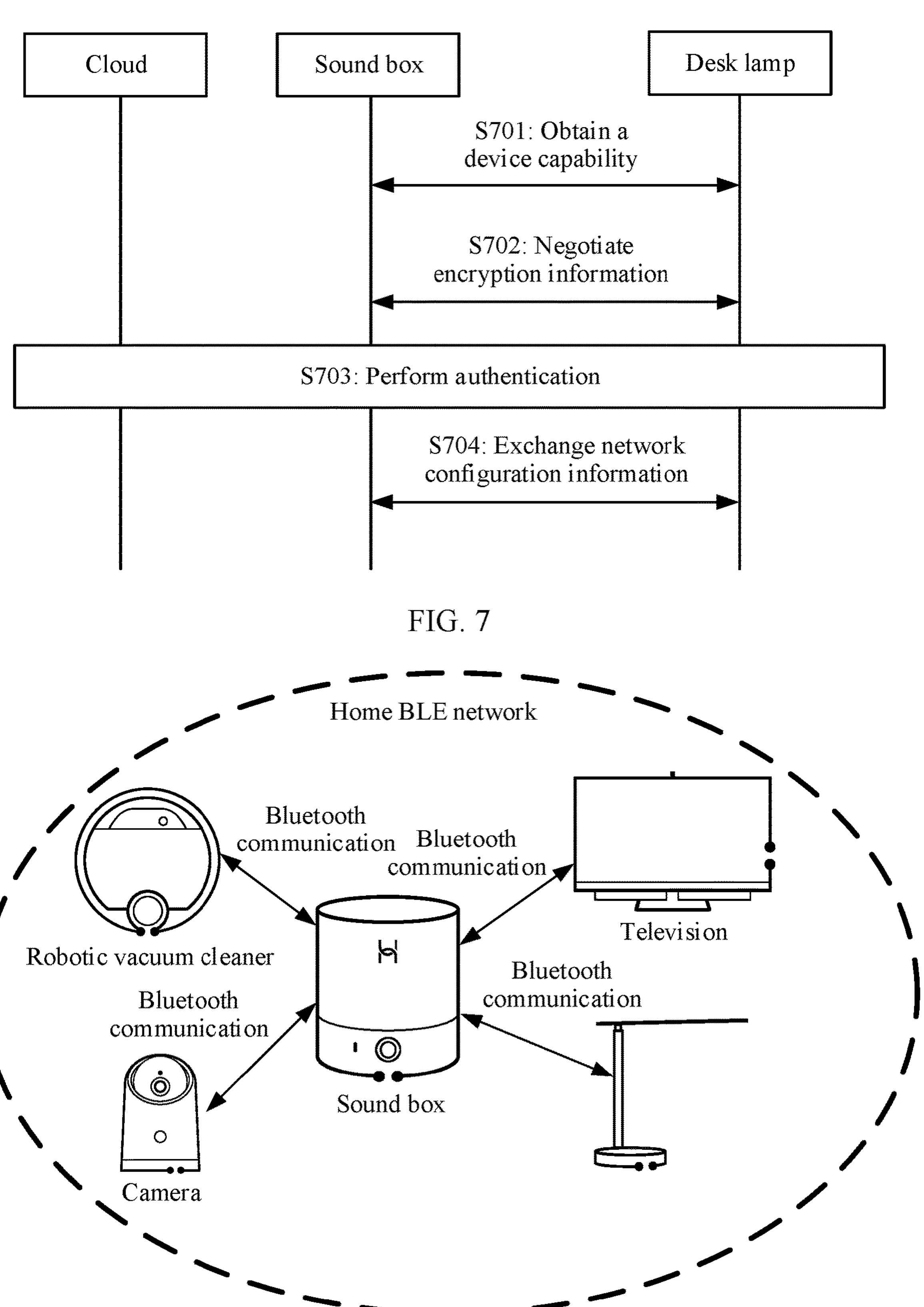
FIG. 7 is a schematic flowchart of an example in which a sound box configures a network for a desk lamp.
FIG. 8 is a schematic diagram of an example of a scenario in which an electronic device is added to a home BLE network.

For example, in response to the received indication information, the sound box may perform a BLE network configuration process with the desk lamp, to add the desk lamp to the BLE network. The BLE network configuration process for the sound box and desk lamp is performed according to the existing Bluetooth standard. The following briefly describes the BLE network configuration process for the sound box and desk lamp. FIG. 7 is a schematic flowchart of an example in which a sound box configures a network for a desk lamp. Refer to FIG. 7. The method specifically includes the following steps.

S701: Obtain a device capability.

Specifically, a sound box and a desk lamp exchange respective device capabilities. For example, the sound box may send the device capability of the sound box to the desk lamp based on address information of the desk lamp obtained in S501. Optionally, the device capability may include but is not limited to an encryption algorithm supported by the sound box. For example, the desk lamp receives the device capability of the sound box sent by the sound box. The desk lamp may send the device capability (for example, a supported encryption algorithm) of the desk lamp to the sound box.

S702: Negotiate encryption information.

For example, the sound box and the desk lamp may negotiate the encryption information, where the encryption information may be used to encrypt subsequently transmitted data. Specifically, the sound box and the desk lamp may obtain the encryption information according to the encryption algorithm supported by the sound box and the encryption algorithm supported by the desk lamp. The sound box may exchange the obtained encrypted information with the desk lamp, so that the sound box and the desk lamp store corresponding encrypted information. For example, an encryption/decryption pair may be stored. In a subsequent interaction process, the sound box may encrypt data based on an encryption key, and the desk lamp may decrypt the data based on the decryption key.

S703: Perform authentication.

Optionally, the sound box performs bidirectional authentication with the desk lamp on the cloud. For example, the sound box may send, to the cloud, the device information (including but not limited to the identification information of the desk lamp, the address information of the desk lamp, and a UUID of the desk lamp) of the desk lamp obtained in S501. The cloud may generate random code based on the obtained device information, and send the random code to the sound box. The sound box forwards the random code to the desk lamp. The desk lamp can generate new random code based on the device information and the obtained random code. The desk lamp sends the newly generated random code to the sound box, and the sound box sends the random code to the cloud. The cloud verifies the obtained random code, and, feeds back an authentication success result to the sound box after the verification succeeds.

It should be noted that in another embodiment, S701 to S702 may be skipped, or S703 may be skipped, or a process of S701 to S703 may be skipped. This is not limited in this application.

S704: Exchange network configuration information.

For example, after obtaining the authentication success result sent by the cloud, the sound box may exchange the network configuration information with the desk lamp. Optionally, the network configuration information includes but is not limited to BLE address information and data encryption information that are generated by the sound box for the desk lamp. Optionally, the BLE address information is address information used by the desk lamp to communicate with the sound box or another device in the BLE network after the desk lamp is added to the BLE network.

The data encryption information is the encryption information used by the desk lamp to communicate with the sound box or the another device in the BLE network after the desk lamp is added to the BLE network.

It should be noted that the foregoing description is merely a brief description of a network configuration process. For specific details, refer to related content in an existing Bluetooth standard. Details are not described again in this application.

In a possible implementation, the desk lamp performs S501, that is, after the BLE network configuration broadcast is sent, an indicator of the desk lamp may blink or display a color (for example, blue) light, to indicate that the desk lamp is performing network configuration. For example, after network configuration between the desk lamp and the sound box is successfully performed, the indicator of the desk lamp may stop blinking or display a white light, to prompt that the desk lamp is paired.

Figure 6D:
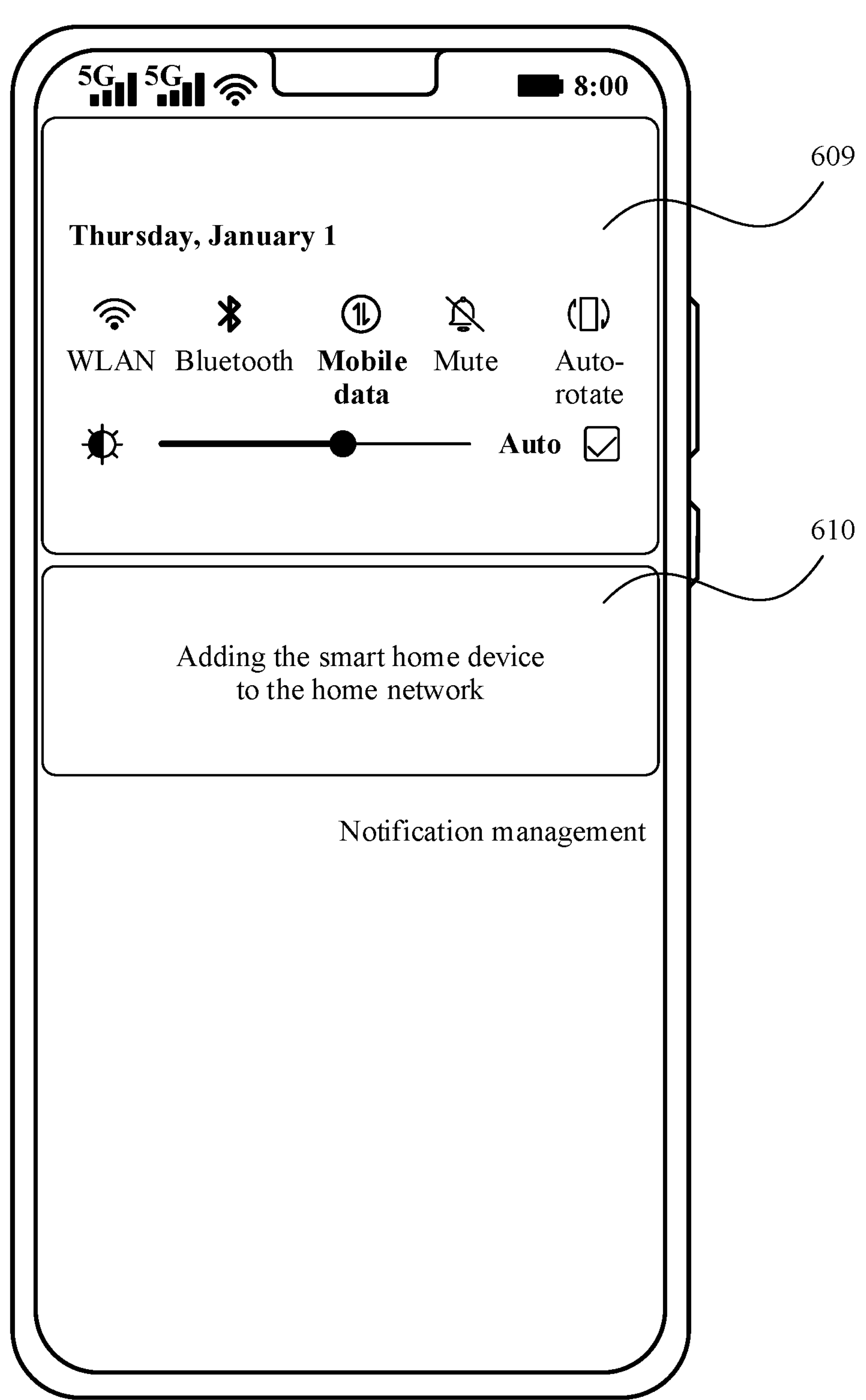

In another possible implementation, after S505, the prompt box of the mobile phone may display prompt information, used to indicate that the home network is being configured for the desk lamp. For example, refer to FIG. 6*d*. A drop-down notification bar 609 may include a prompt box 610. For example, the prompt box 610 may include prompt information used to indicate that a home network is being configured for the desk lamp. For example, the prompt information may be “Adding a smart home device to the home network”. The foregoing prompt manner is merely an example, and is not limited in this application.

S508: The sound box indicates, to the mobile phone, that the desk lamp is added to the BLE network.

For example, after the sound box completes network configuration for the desk lamp, the sound box sends indication information to the mobile phone. The indication information may include but is not limited to the identification information of the desk lamp, to indicate that the desk lamp is added to the BLE network.

Figure 6E:
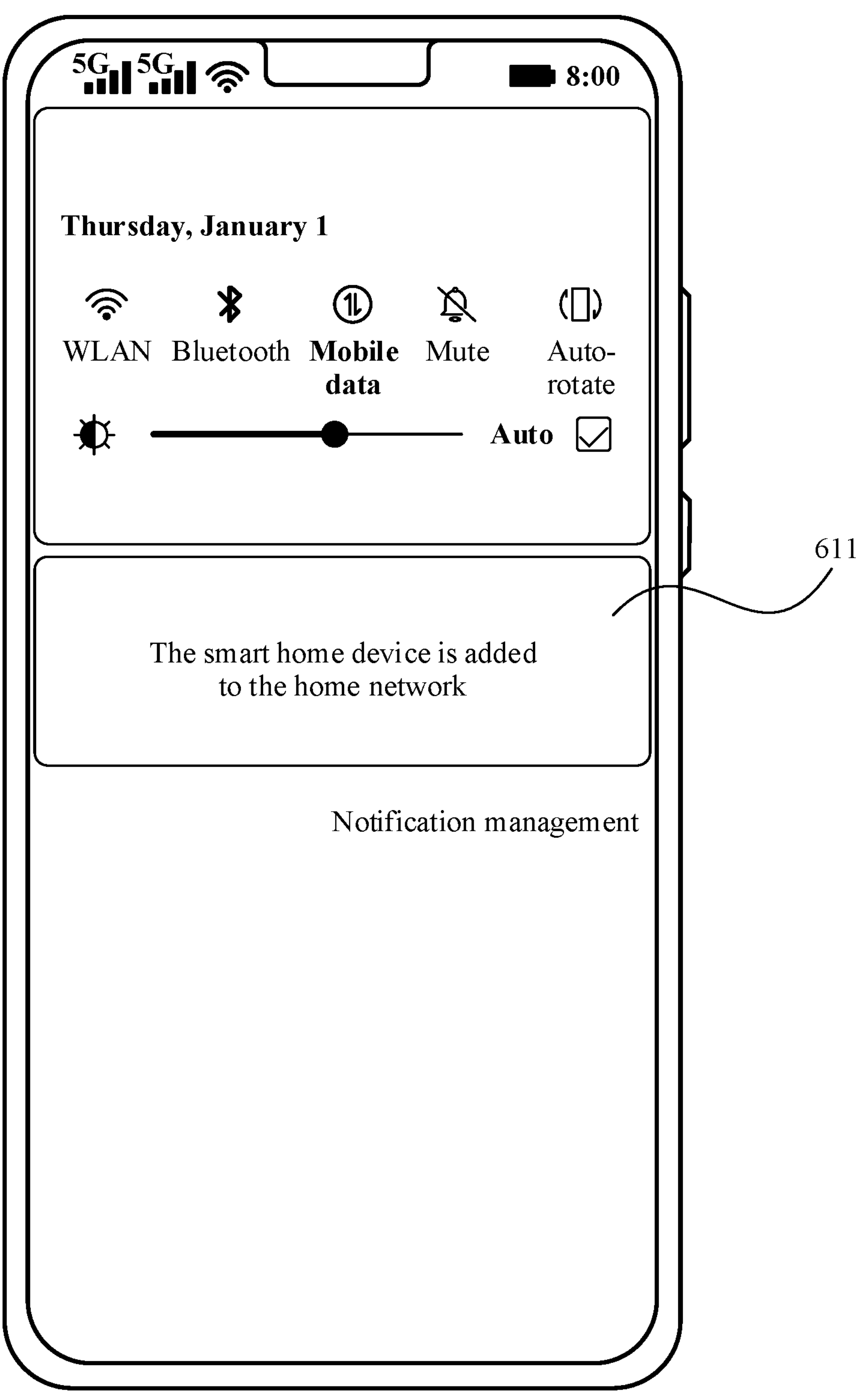

Refer to FIG. 6*e*. For example, the prompt box 611 may include prompt information used to indicate that the desk lamp is added to the home network. For example, the prompt information may be “The smart home device is added to the home network”.

Figure 6F:
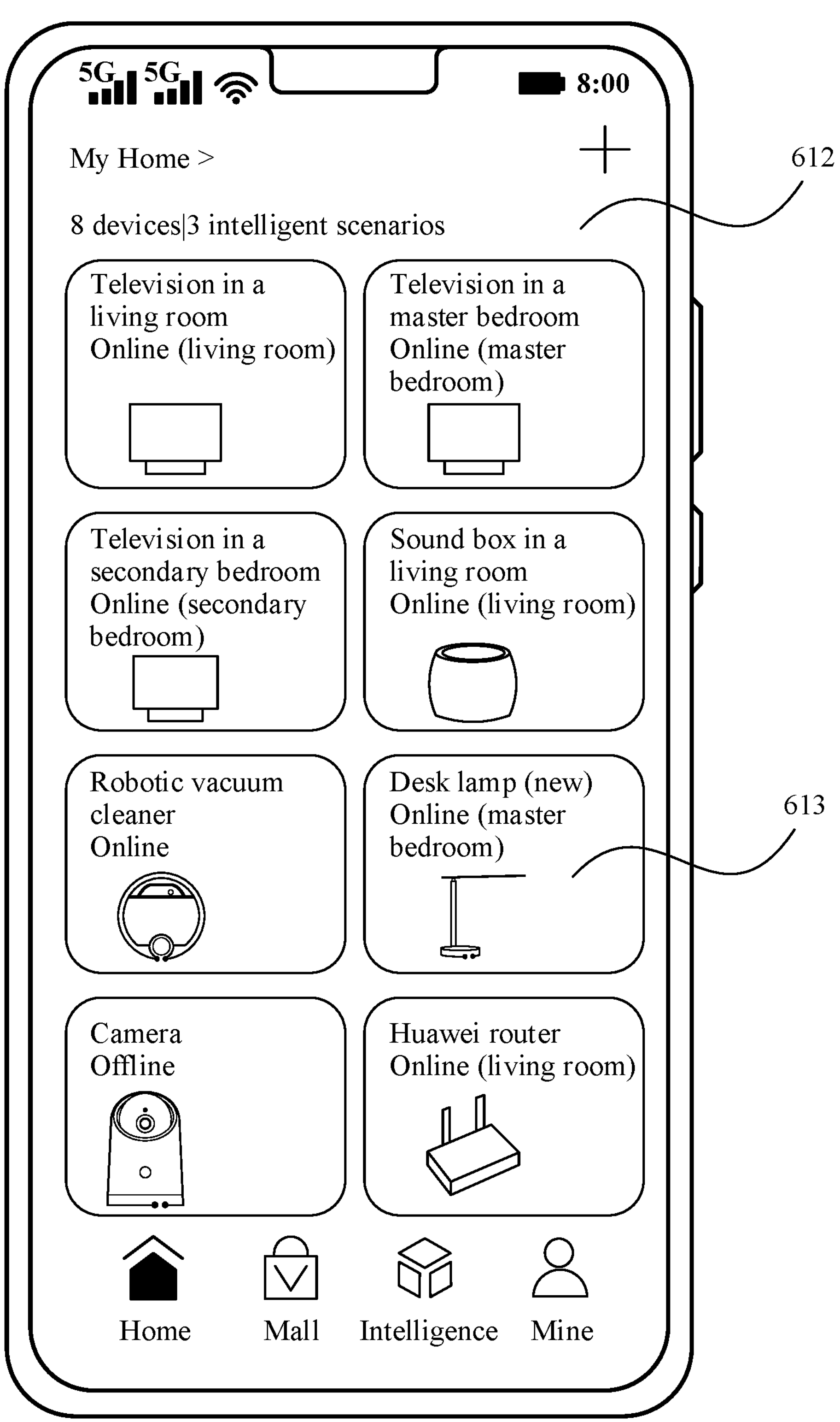

Refer to FIG. 6*f*. For example, after the mobile phone responds to the received indication information sent by the sound box, when the mobile phone is unlocked, the mobile phone may automatically pop up an AI Life application interface 612. In another embodiment, the mobile phone may display the AI Life application interface 612 after receiving that the user taps an AI Life application icon. For example, the AI Life application interface 612 includes one or more smart home device controls. Each smart home device control corresponds to one smart home device, and is used to indicate identification information (for example, a device name) of the smart home device, a location (for example, a bedroom light or a living room light) in a home, and an online status of the smart home device.

Still refer to FIG. 6*f*. For example, after the mobile phone determines that the desk lamp is added to the home network, the AI Life application interface 612 displays a desk lamp control 613. The desk lamp control 613 includes but is not limited to identification information (for example, a “desk lamp”) of the desk lamp, an online status (for example, “online”) of the desk lamp, and may further include location information (for example, “master bedroom”) of the desk lamp. Optionally, the location information may be set by default, and the user modifies the location information in the AI Life application. Optionally, the identification information of the desk lamp may also be modified in the AI Life application. Optionally, the desk lamp control 613 may further include a new joining identifier (for example, "new"), to indicate that the desk lamp is a newly joined device. After the user taps the desk lamp control 613 to set the desk lamp, the new joining identifier may disappear.

In a possible implementation, after the desk lamp is turned off and turned on again, the desk lamp is still in the BLE network. To be specific, the desk lamp still stores the network configuration information of the BLE network (for example, the foregoing address information of the BLE network), and the sound box stores the network configuration information of the BLE network of the desk lamp. The desk lamp and sound box can still communicate with each other through Bluetooth based on the BLE network configuration information.

In another possible implementation, if the desk lamp is restored to factory defaults, the desk lamp needs to perform the steps shown in FIG. 5 again.

In still another possible implementation, the user may remove the desk lamp from the BLE network by using the AI Life application. For example, the user may press and hold the desk lamp control 613 to pop up an operation box. A delete device option is available in the operation box. If the user taps the delete device option, the sound box is indicated to remove the desk lamp from the BLE network. For example, the sound box may delete the network configuration information of the desk lamp.

Figure 9A:
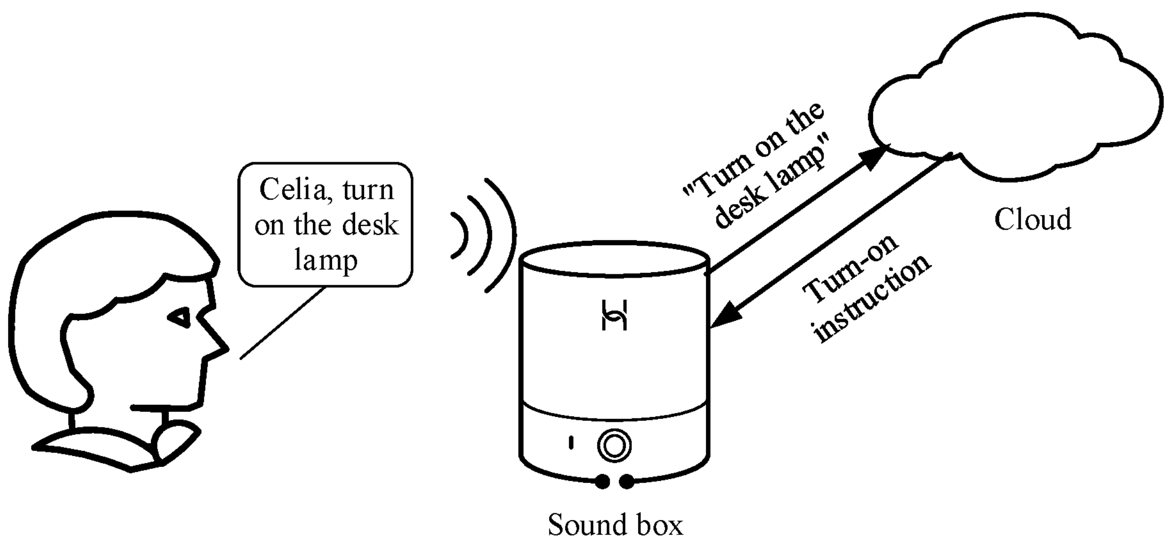
FIG. 9*a* and FIG. 9*b* are schematic diagrams of examples of application scenarios of an electronic device in a BLE network.

Refer to FIG. 8. For example, after the sound box configures a network for a desk lamp, the desk lamp is added to the home BLE network. For example, the sound box may perform Bluetooth communication with the desk lamp. For example, as shown in FIG. 9*a*, the user may say "Celia, turn on the desk lamp" to the desk lamp. In response to the received voice instruction, the desk lamp parses the voice instruction, and determines that the voice instruction carries a special field, that is, "Celia". In other words, the sound box may determine that the voice instruction is delivered to the sound box. The sound box may send a voice instruction "Turn on the desk lamp" to the cloud. The cloud may parse the voice instruction to obtain a corresponding control instruction, for example, a turn-on instruction. The cloud sends the turn-on instruction to the sound box.

Figure 9B:
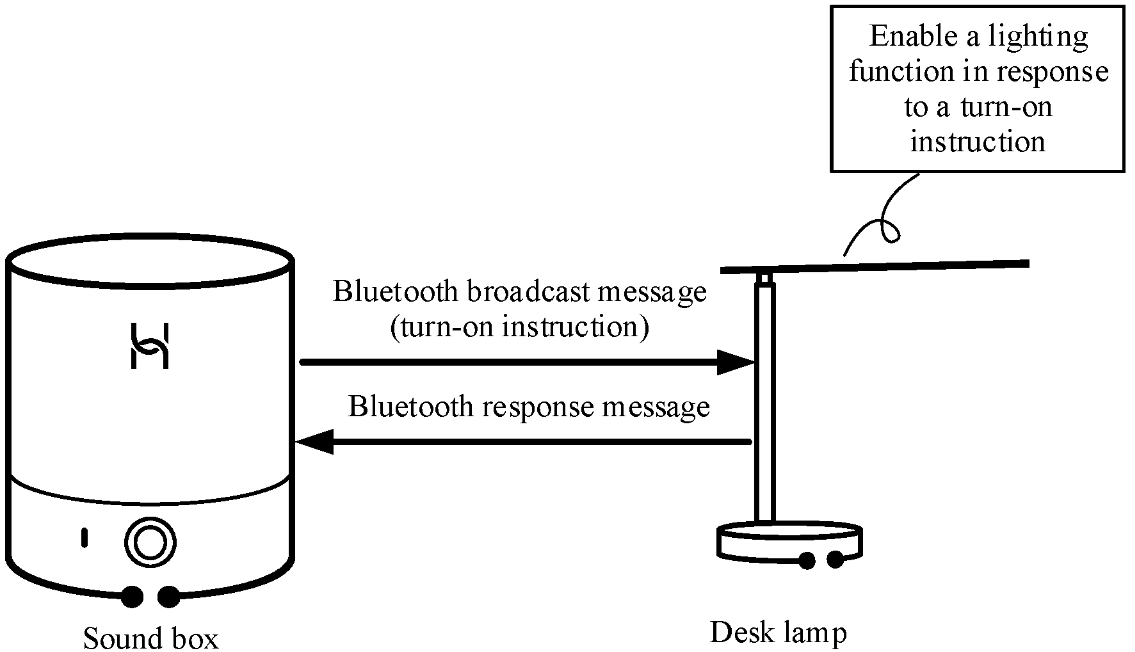

Refer to FIG. 9*b*. After the sound box receives the turn-on instruction sent by the cloud, the sound box may send a Bluetooth broadcast message. Optionally, the Bluetooth broadcast message (for example, in a payload field of the Bluetooth broadcast message) may include the turn-on instruction and BLE address information of the desk lamp (for a concept, refer to the foregoing description). In response to the received Bluetooth broadcast message, the desk lamp parses the Bluetooth broadcast message to obtain the turn-on instruction, and determines that the turn-on instruction is delivered to the desk lamp. For example, the desk lamp enables a lighting function in response to the turn-on instruction. Optionally, the desk lamp returns a Bluetooth response message to the sound box.

It should be noted that a Bluetooth broadcast is used as an example for description in FIG. 9*b*. In another embodiment, after a network configuration is performed between the sound box and the desk lamp, the sound box may establish a Bluetooth connection to a Bluetooth. For a process of establishing the Bluetooth connection, refer to an existing Bluetooth protocol. This is not limited in this application. For example, the sound box may exchange Bluetooth data with the desk lamp by using the Bluetooth connection between the sound box and the desk lamp.

It should be further noted that, in this embodiment of this application, steps performed by the cloud, for example, operations such as parsing the voice instruction and obtaining the control instruction, may also be performed by a sound box. To be specific, the sound box may not depend on the cloud, but independently perform the steps performed by the cloud.

Figure 10:
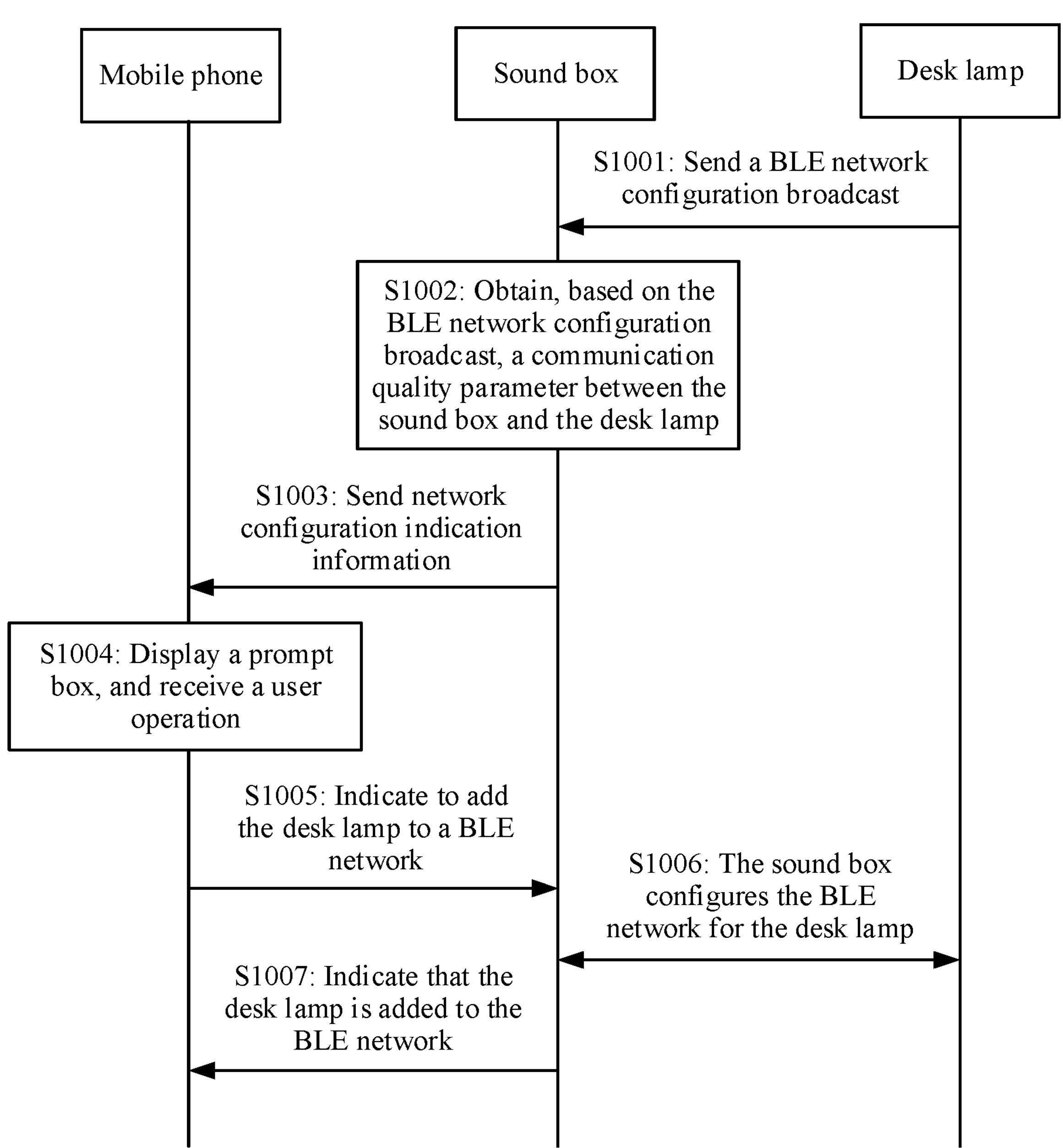
FIG. 10 is a schematic flowchart of an example in which an electronic device is added to a BLE network.

FIG. 10 is another schematic flowchart of an example in which an electronic device is added to a BLE network. Refer to FIG. 10. The method specifically includes the following steps.

S1001: A desk lamp sends a BLE network configuration broadcast.

S1002: A sound box obtains, based on the BLE network configuration broadcast, a communication quality parameter between the sound box and the desk lamp.

For specific descriptions of S1001 and S1002, refer to related content of S501 and S502. Details are not described herein again.

S1003: The sound box sends network configuration indication information to a mobile phone.

For example, when the mobile phone may communicate with the sound box through Bluetooth or a wireless network (for example, a Wi-Fi network), the sound box may send the indication information to the mobile phone. For parts that are not described, refer to related descriptions of S503 and S504. Details are not described herein again. In other words, in a scenario in which the mobile phone performs point-to-point communication with the sound box, the sound box may directly send the indication information to the mobile phone without forwarding by a cloud.

It should be noted that, in this application scenario, a Bluetooth connection or a Wi-Fi connection is pre-established between the mobile phone and the sound box. For a specific establishment process, refer to an existing protocol. This is not limited in this application.

S1004: The mobile phone displays a prompt box, and receives a user operation.

S1005: The mobile phone indicates the sound box to add the desk lamp to the BLE network.

S1006: The sound box configures the BLE network for the desk lamp.

S1007: The sound box indicates, to the mobile phone, that the desk lamp is added to the BLE network.

For specific descriptions of S1004 to S1007, refer to related content of S505 to S508. Details are not described herein again.

Figure 11:
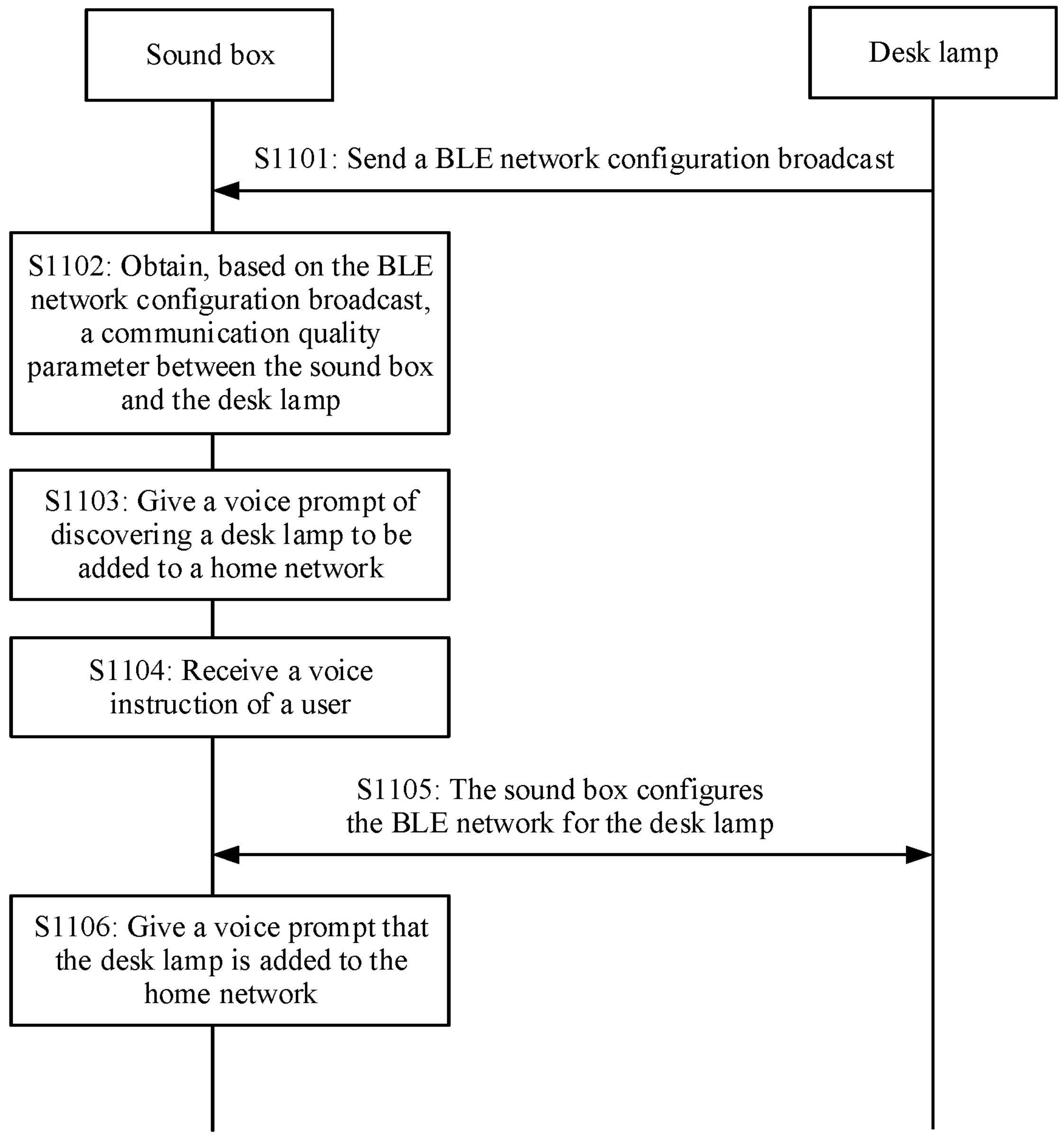
FIG. 11 is a schematic flowchart of an example in which an electronic device is added to a BLE network.

FIG. 11 is another schematic flowchart of an example in which an electronic device is added to a BLE network. Refer to FIG. 10. The method specifically includes the following steps.

S1101: A desk lamp sends a BLE network configuration broadcast.

S1102: A sound box obtains, based on the BLE network configuration broadcast, a communication quality parameter between the sound box and the desk lamp.

S1103: The sound box gives a voice prompt of discovering a desk lamp to be added to a home network.

For example, after the sound box determines that the desk lamp is allowed to join the home network, the sound box may prompt the user by a voice that there is currently a smart home device to be added to the home network. For example, the sound box may send a voice "Found a desk lamp to be added to the home network. Allow the desk lamp to join the home network?". Optionally, if the sound box has a display, a prompt box may also be displayed on the display. The prompt box may include prompt information, used to prompt that currently, there is a smart home device to be added to the home network. For specific implementation, refer to the implementation of the mobile phone in the foregoing embodiment. Details are not described herein again.

S1104: The sound box receives a voice instruction of the user.

For example, the user may send the voice instruction to the sound box, for example, "Allow" or "Yes". In response to the received voice instruction, the sound box parses the voice instruction, or parses the voice instruction on the cloud, to determine that the user allows the desk lamp to join the BLE network.

S1105: The sound box configures the BLE network for the desk lamp.

For specific details, refer to related content in S507. Details are not described herein again.

S1106: The sound box gives a voice prompt that the desk lamp is added to the home network.

For example, after the sound box configures the network for the desk lamp, the sound box may prompt the user by a voice that the desk lamp is added to the home network. For example, the sound box may send a voice "The desk lamp is added to the home network". Optionally, the sound box may also display the prompt information on the display, to indicate that the desk lamp is added to the home network. This is not limited in this application. For parts that are not described in the foregoing steps, refer to related content in FIG. 10. Details are not described herein again.

It may be understood that, to implement the foregoing functions, the electronic device includes corresponding hardware and/or software modules for executing the functions. In combination with example algorithm steps described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12:
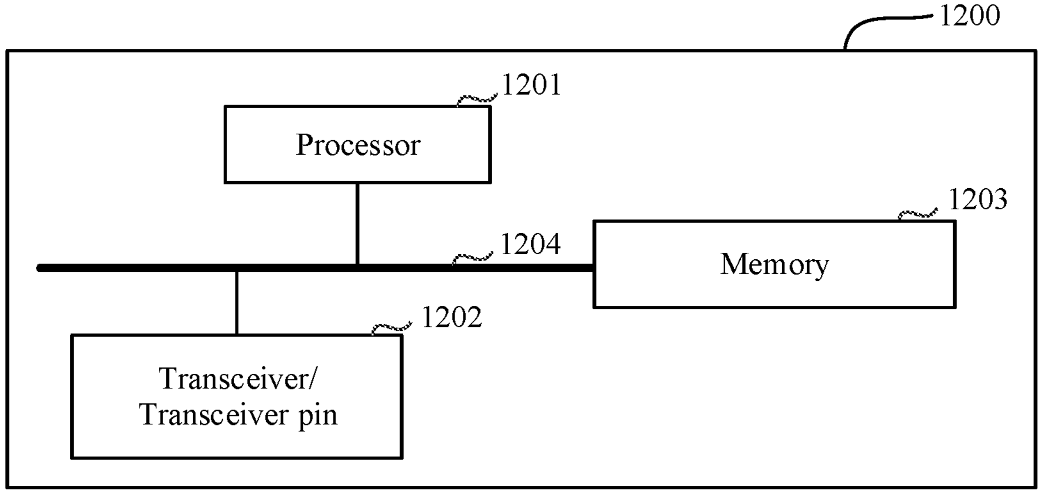
FIG. 12 is a schematic diagram of an example of a structure of an apparatus.

In an example, FIG. 12 is a schematic block diagram of an apparatus 1200 according to an embodiment of this application. The apparatus 1200 may include a processor 1201 and a transceiver/transceiver pin 1202, and optionally, further include a memory 1203.

Components of the apparatus 1200 are coupled together through a bus 1204. In addition to a data bus, the bus 1204 further includes a power bus, a control bus, and a status signal bus. However, for clarity of description, various buses are referred to as the bus 1204 in the figure.

Optionally, the memory 1203 may be used for instructions in the foregoing method embodiments. The processor 1201 may be configured to execute the instructions in the memory 1203, control a receive pin to receive a signal, and control a transmit pin to send a signal.

The apparatus 1200 may be the electronic device or the chip of the electronic device in the foregoing method embodiments.

All related content of the steps in the foregoing method embodiments may be cited in function descriptions of the corresponding functional modules. Details are not described herein again.

This embodiment further provides a computer storage medium. The computer storage medium stores computer instructions. When the computer instructions are run on an electronic device, the electronic device performs the foregoing related method steps to implement the Bluetooth communication method in the foregoing embodiments.

This embodiment further provides a computer program product. When the computer program product runs on a computer, the computer performs the foregoing related steps, to implement the Bluetooth communication method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, so that the chip performs the Bluetooth communication method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on descriptions about the foregoing implementations, a person skilled in the art may understand that, for a purpose of convenient and brief description, division into the foregoing function modules is used as an example for illustration. In actual application, the foregoing functions may be allocated to different function modules and implemented according to a requirement. In other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

Any content of embodiments of this application may be freely combined, so may any content of a same embodiment of this application. Any combination of the foregoing content shall fall within the scope of this application.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The storage medium includes various media that can store program code, such as a USB flash drive, a removable hard disk, a read-only memory (readonly memory, ROM), a random access memory (random access memory, RAM), a magnetic disk, or an optical disc.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

Methods or algorithm steps described in combination with the content disclosed in embodiments of this application may be implemented by hardware, or may be implemented by a processor by executing a software instruction. The software instruction may include a corresponding software module. The software module may be stored in a random access memory (Random Access Memory, RAM), a flash memory, a read only memory (Read Only Memory, ROM), an erasable programmable read only memory (Erasable Programmable ROM, EPROM), an electrically erasable programmable read only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a special-purpose computer.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make many modifications without departing from the purposes of this application and the protection scope of the claims, and all the modifications shall fall within the protection scope of this application.

What is claimed is:

1. A Bluetooth communication system, comprising a first electronic device, a second electronic device, and a third electronic device, wherein the second electronic device belongs to a Bluetooth low energy (BLE) network;

the first electronic device is configured to:

send a BLE network configuration broadcast message, wherein the BLE network configuration broadcast message indicates that the first electronic device requests to be added to the BLE network;

the second electronic device is configured to:

receive the BLE network configuration broadcast message; and send first network configuration indication information to the third electronic device in response to the received BLE network configuration broadcast message, wherein the first network configuration indication information indicates that the first electronic device requests to be added to the BLE network;

the third electronic device is configured to:

receive the first network configuration indication information;

display a first prompt box in response to the received first network configuration indication information, wherein the first prompt box comprises first indication information, and the first indication information asks whether to add the first electronic device to the BLE network;

receive a first user operation; and send second network configuration indication information to the second electronic device in response to the received first user operation, wherein the second network configuration indication information indicates to add the first electronic device to the BLE network; and the second electronic device is further configured to:

receive the second network configuration indication information; and add the first electronic device to the BLE network in response to the received second network configuration indication information.

2. The system according to claim 1, wherein the second electronic device is further configured to:

obtain a communication quality parameter between the second electronic device and the first electronic device in response to the received BLE network configuration broadcast message.

3. The system according to claim 2, wherein the second electronic device is further configured to:

based at least on the communication quality parameter being greater than a first threshold, send the first network configuration indication information to the third electronic device.

4. The system according to claim 1, wherein the second electronic device performs data exchange with a cloud through a first communication connection, the third electronic device performs data exchange with the cloud through a second communication connection, and the second electronic device is further configured to:

send the first network configuration indication information to the cloud through the first communication connection, so that the cloud sends the first network configuration indication information to the third electronic device through the second communication connection.

5. The system according to claim 4, wherein the first communication connection is a wireless fidelity (Wi-Fi) connection, and the second communication connection is a cellular connection or a Wi-Fi connection.

6. The system according to claim 1, wherein the second electronic device performs data exchange with the third electronic device through a third communication connection, and the second electronic device is further configured to:

send the first network configuration indication information to the third electronic device through the third communication connection.

7. The system according to claim 6, wherein the third communication connection is a Wi-Fi connection or a Bluetooth connection.

8. The system according to claim 1, wherein the third electronic device is specifically configured to:

display the first prompt box in a first display interface in response to the received first network configuration indication information.

9. The system according to claim 8, wherein the first display interface is an always on display screen, a lock screen, or a home screen.

10. The system according to claim 1, wherein the third electronic device is specifically configured to:

display the first prompt box on a leftmost screen or a notification bar in response to the received first network configuration indication information.

11. A Bluetooth communication method, comprising:

receiving, by a first electronic device, first network configuration indication information from a second electronic device, wherein the first network configuration indication information is sent by the second electronic device in response to a received Bluetooth low energy (BLE) network configuration broadcast message from a third electronic device, the BLE network configuration broadcast message indicates that the third electronic device requests to be added to a BLE network, the first network configuration indication information indicates that the third electronic device requests to be added to the BLE network, and the second electronic device belongs to the BLE network;

displaying, by the first electronic device, a first prompt box in response to the received first network configuration indication information, wherein the first prompt box comprises first indication information, and the first indication information asks whether to add the third electronic device to the BLE network; and sending, by the first electronic device, second network configuration indication information to the second electronic device in response to a received first user operation, wherein the second network configuration indication information indicates to add the third electronic device to the BLE network, so that the second electronic device adds the third electronic device to the BLE network in response to the received second network configuration indication information.

12. The method according to claim 11, wherein the first network configuration indication information is sent by the second electronic device to a cloud through a first communication connection between the second electronic device and the cloud, and is sent by the cloud to the first electronic device through a second communication connection between the cloud and the first electronic device.

13. The method according to claim 12, wherein the first communication connection is a wireless fidelity (Wi-Fi) connection, and the second communication connection is a cellular connection or a Wi-Fi connection.

14. The method according to claim 11, wherein the first electronic device performs data exchange with the second electronic device through a third communication connection; and the receiving, by the first electronic device, first network configuration indication information from a second electronic device comprises:

receiving, by the first electronic device, the first network configuration indication information that is sent by the second electronic device through the third communication connection.

15. The method according to claim 14, wherein the third communication connection is a Wi-Fi connection or a Bluetooth connection.

16. The method according to claim 11, wherein the displaying, by the first electronic device, the first prompt box in response to the received first network configuration indication information comprises:

displaying, by the first electronic device, the first prompt box in a first display interface in response to the received first network configuration indication information.

17. The method according to claim 16, wherein the first display interface is an always on display screen, a lock screen, or a home screen.

18. The method according to claim 16, wherein the displaying, by the first electronic device, the first prompt box in response to the received first network configuration indication information comprises:

displaying, by the first electronic device, the first prompt box on a leftmost screen or a notification bar in response to the received first network configuration indication information.

19. The method according to claim 11, wherein the method further comprises:

receiving, by the first electronic device, third network configuration indication information sent by the second electronic device, wherein the third network configuration indication information indicates that the third electronic device is added to the BLE network.

20. The method according to claim 19, wherein the method further comprises:

displaying, by the first electronic device, an AI Life application interface in response to the received third network configuration indication information, wherein the AI Life application interface comprises a second prompt box, the second prompt box comprises second indication information, and the second indication information indicates that the third electronic device is added to the BLE network.

* * * * *